Dec. 25, 1962 P. VINSON ETAL 3,070,686
AUTOMATIC HONEYCOMB WELDING MACHINE
Filed Aug. 11, 1959 7 Sheets-Sheet 1
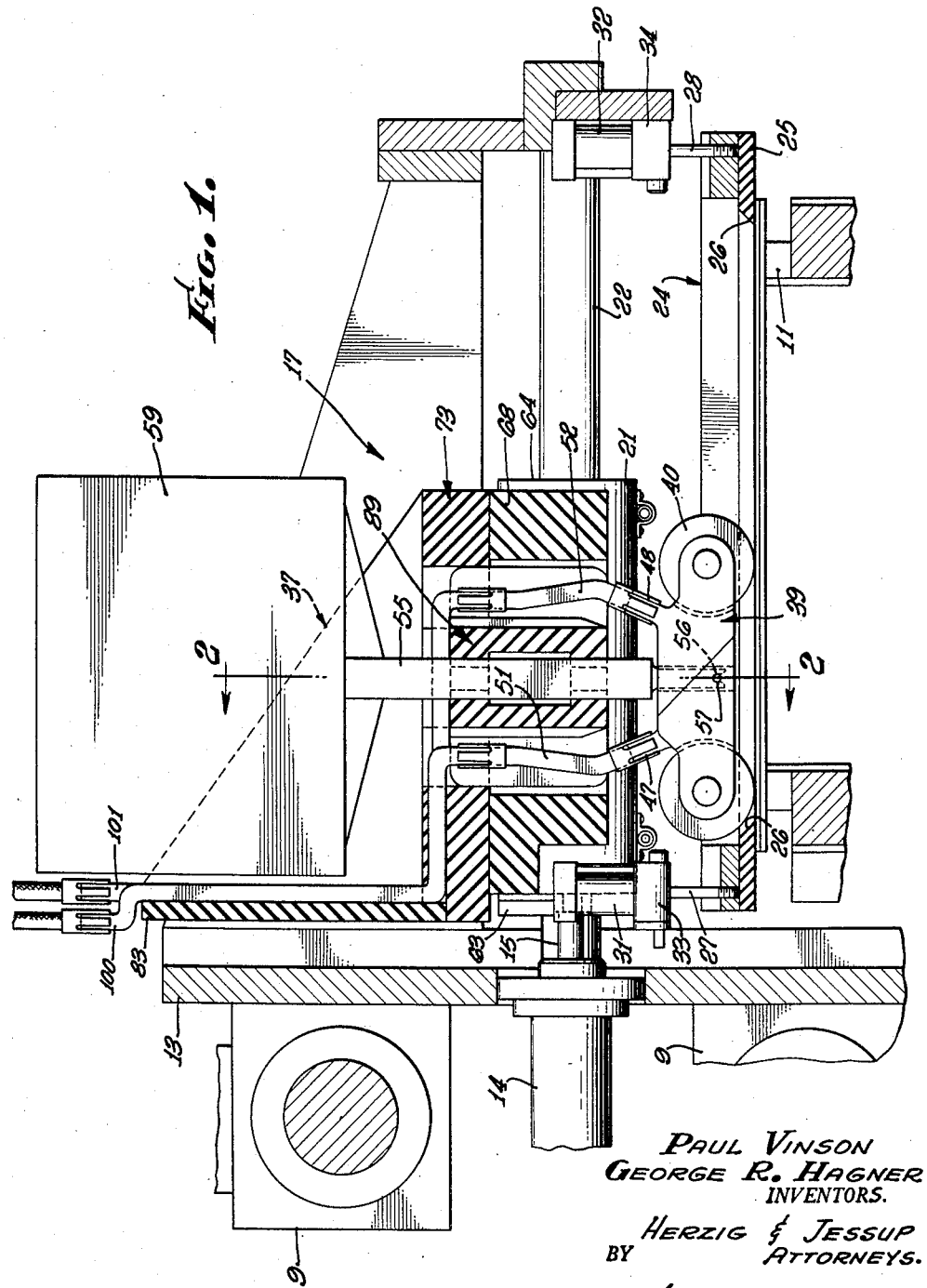
PAUL VINSON
GEORGE R. HAGNER
INVENTORS.
BY HERZIG & JESSUP
ATTORNEYS.

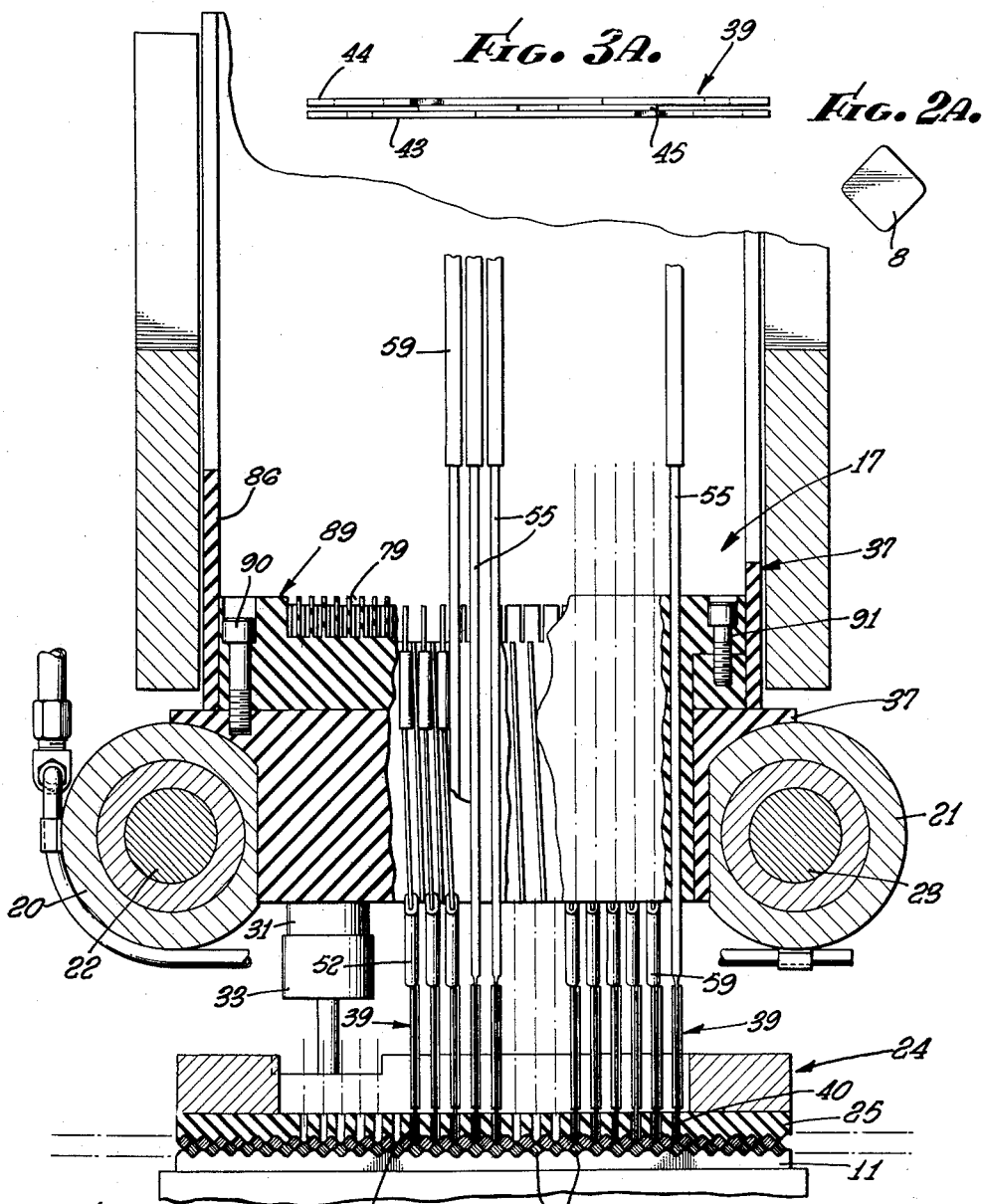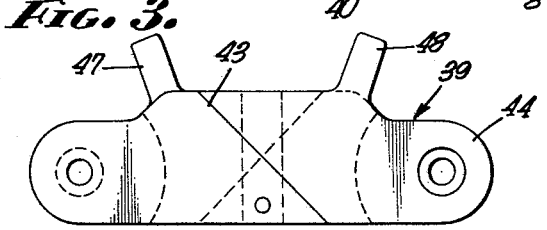

PAUL VINSON
GEORGE R. HAGNER
INVENTORS.

BY HERZIG & JESSUP
ATTORNEYS.

Dec. 25, 1962 P. VINSON ETAL 3,070,686
AUTOMATIC HONEYCOMB WELDING MACHINE
Filed Aug. 11, 1959 7 Sheets-Sheet 4
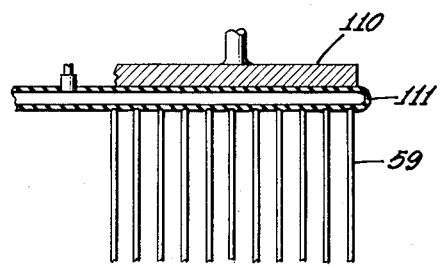
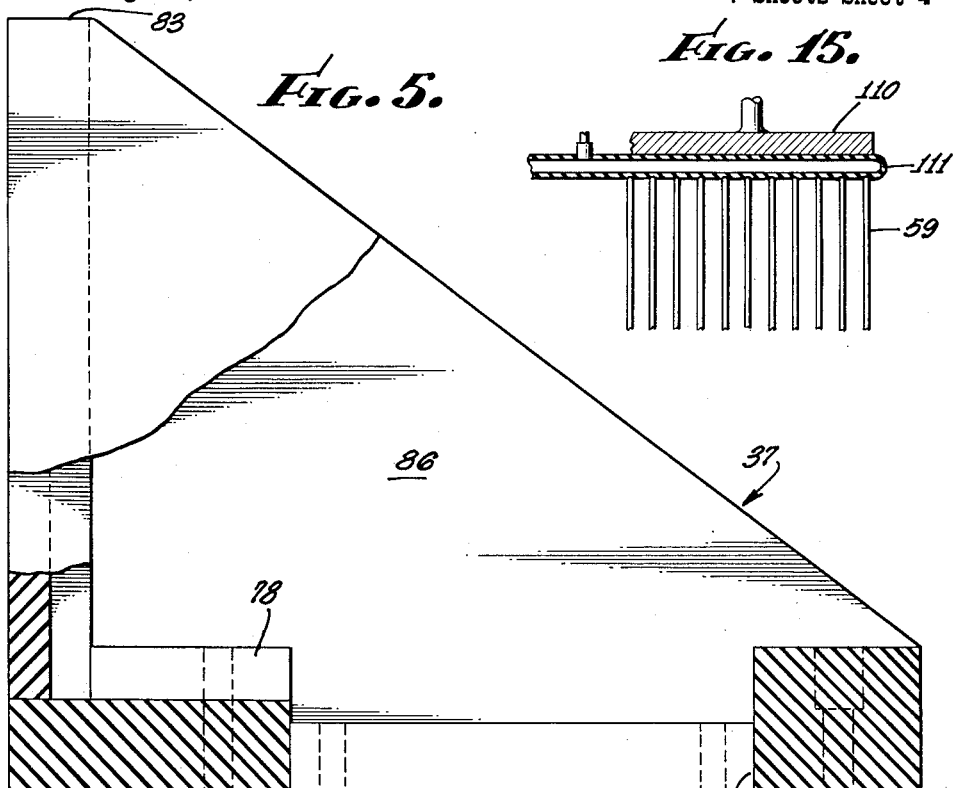
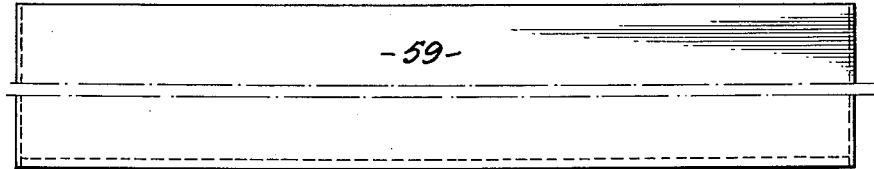
PAUL VINSON
GEORGE R. HAGNER
INVENTORS.
BY HERZIG & JESSUP
ATTORNEYS.

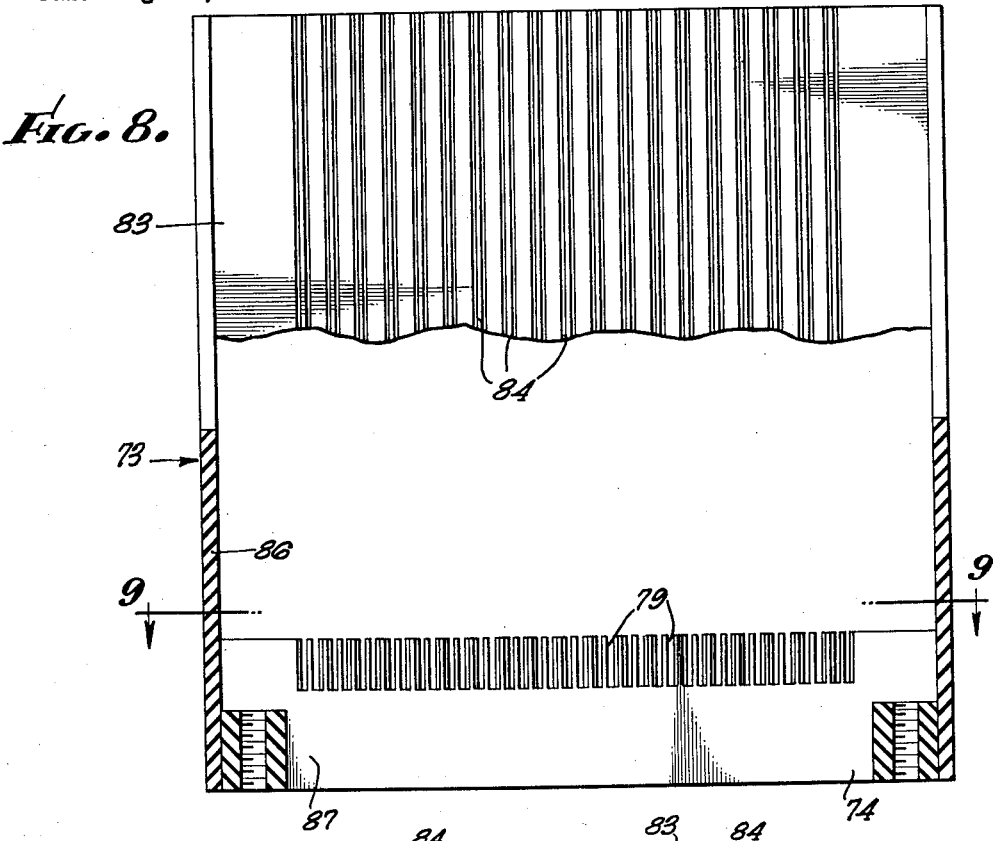
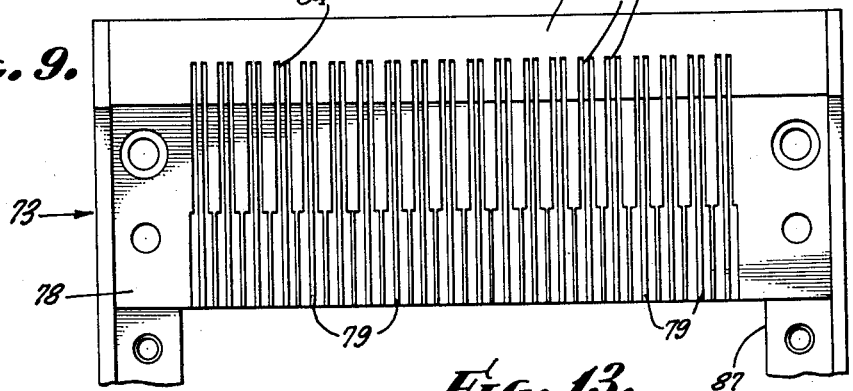
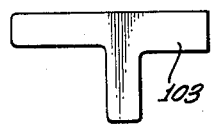
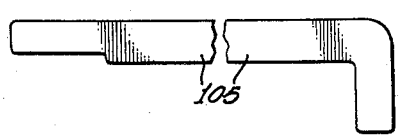

PAUL VINSON
GEORGE R. HAGNER
INVENTORS.

HERZIG & JESSUP
BY ATTORNEYS.

Dec. 25, 1962 P. VINSON ETAL 3,070,686
AUTOMATIC HONEYCOMB WELDING MACHINE
Filed Aug. 11, 1959 7 Sheets-Sheet 7
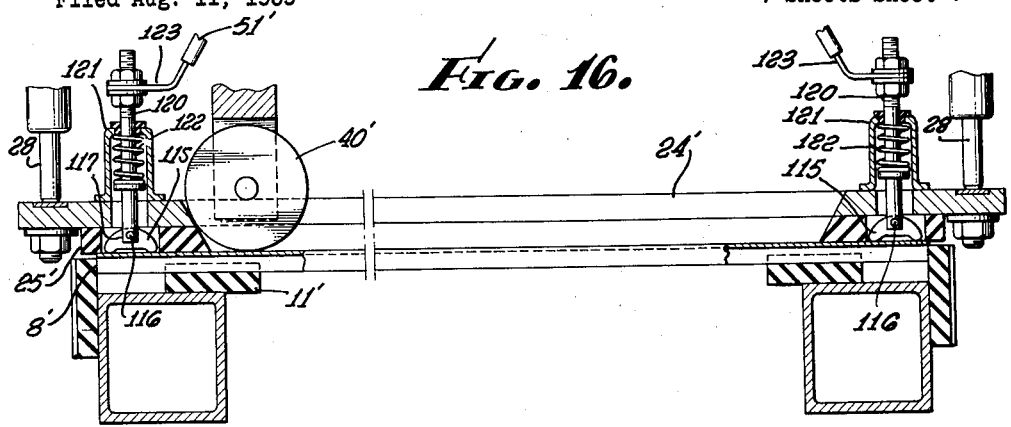
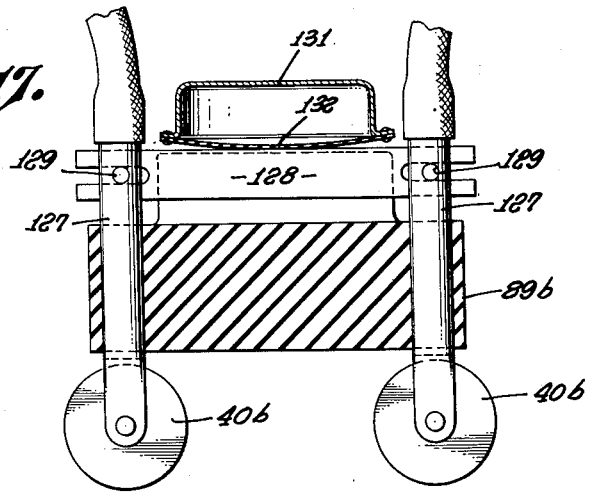
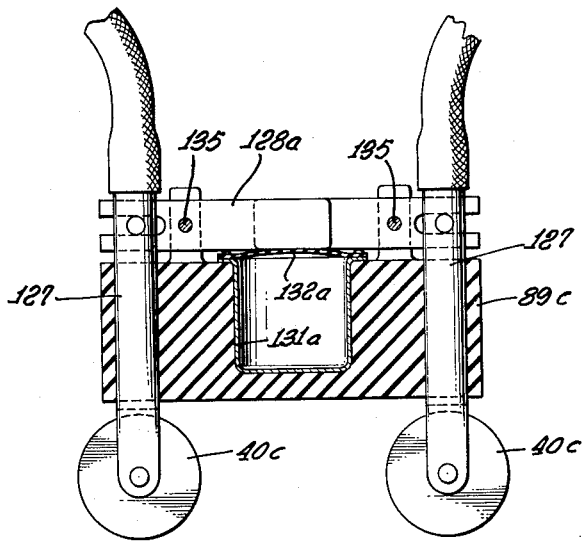
PAUL VINSON
GEORGE R. HAGNER
INVENTORS.
BY HERZIG & JESSUP
ATTORNEYS.

United States Patent Office 3,070,686
Patented Dec. 25, 1962

3,070,686
AUTOMATIC HONEYCOMB WELDING MACHINE
Paul Vinson, San Pedro, and George R. Hagner, Coronado, Calif., assignors to Dynacor, Gardena, Calif., a corporation of California
Filed Aug. 11, 1959, Ser. No. 833,001
9 Claims. (Cl. 219—82)

This invention relates to a machine for the automatic production of welded honeycomb structures of the type used in the aircraft industry and other fields. The invention relates particularly to improvements in a welding head for such machines.

The honeycomb structures referred to are lightweight construction material fabricated from relatively thin, corrugated stainless steel sheets, for example, the sheets being welded together in a laminar or sandwiched construction.

In fabricating the honeycomb structures, the corrugated sheets are stacked on each other to form a sandwich and the laminations or sheets are welded together by spot welding or seam welding along the abutting portions of adjacent sheets. In other words, the sheets are welded together to provide a honeycomb structure, the corrugations in adjacent sheets providing open spaces or cells between them.

The machine of this invention is an automatic machine for spot welding sheets together along parallel lines confronting to the corrugations and particularly for spot or seam welding along a plurality or parallel lines at the same time. The herein invention is particularly concerned with an improved automatic welding head for the machine which performs the plural welding operation, the head being then lifted and indexed in a direction and an amount to be ready to perform a similar group or plurality of welds. The machine operates automatically to move the welding head at the desired speed while the welds are being made, to lift the head and index it for another group of welds, moving in the opposite direction.

The welding head itself, in a preferred form of the invention, comprises a plurality of welding carriages or dollies, each having a pair of contactor rollers between which the welding circuit is completed through the honeycomb structure. The electrical current periodically arcs between a roller and the honeycomb structure so as to produce spaced spot welds between the laminations. During welding the honeycomb core with conductive backing bars between corrugated sheets rest on an insulative rack or frame. The electrical circuitry is entirely within the welding head, i.e., there are no circuit connections to a rack or platform on which the honeycomb core rests.

Each of the welding dolly or carriage assemblies is provided with means to impress the desired necessary weight for proper welding on the welding carriage. This means may take the form of a hopper for each dolly or carriage containing buckshot, the amount of which may be adjusted to provide the desired weight on the welding dolly. The hoppers for the dollies are contained within the assembly of the welding head which is embodied in an appropriate frame work embodying insulating material which is of slotted construction providing for individual electrical circuit connections to the individual welding dollies. Each circuit conductor is connected to an individual transformer. The circuit conductors or leads are preferably constructed of thin strips of conductor material which may appropriately fit into slots provided in the insulative structure of the welding head.

In other forms of the invention, inflatable fluid chambers are used to provide the desired force on each dolly.

In accordance with the foregoing, the primary object of the invention is to provide an improved, simplified, but economical and highly effective machine, for automatically welding together corrugated metal sheets to provide a lightweight honeycomb structure.

Another object of the invention is to provide an improved simplified and effective welding head in a machine as in the foregoing object.

Another object of the invention is to provide an improved welding head for use in a machine for welding together laminated plates in a honeycomb structure wherein automatic welding is accomplished by providing a welding circuit between roller contactors forming a travelling dolly engageable with the sheets being welded.

Another object is to provide a welding head wherein the welding circuit is formed between two spaced contactor rollers so as to maintain uniform electrical resistance in the welding circuit.

Another object is to provide a welding machine for honeycomb cores wherein the cores rest on an insulative rack, all electrical circuitry being part of the welding machine itself.

Another object of the invention is to simplify, make more effective and increase the speed of welding by providing a welding head embodying a plurality of welding dollies as in the foregoing objects operable to travel along the surface of the sheets to weld, and operable to be lifted and indexed to a position for sequential, plural welding operations.

Another object is to successfully realize series welding of honeycomb cores by spaced aligned contactor rollers on the same side of the core without electrical connections other than to the rollers, or to contactors temporarily engageable with the core.

Another object of the invention is to provide improvements in a welding head as in the foregoing object by providing individual hoppers in which variable amounts of buskshot may be provided whereby the desired weight may be applied to individual welding dollies as necessary.

Another object of the invention is to provide improvements in a welding head as in the foregoing objects wherein the welding head is constructed partly of insulating material which is slotted to provide channels for individual electrical circuit connections provided by strip conductors to each individually dolly of the welding head.

Further objects and numerous advantages will become apparent from the following detailed description and annexed drawings, wherein:

FIG. 1 is a side elevation, partly in section, of a preferred form of the invention;

FIG. 2 is a sectional view taken along the line 2—2 of FIG. 1;

FIG. 2A is a detail view of a backing bar used in the machine;

FIG. 3 is a detail partial view of one of the dollies;

FIG. 3A is a horizontal section of FIG. 3;

FIGURE 5 is a detail view of the upper frame structure of the welding head;

FIGURES 6 and 7 are detail views in plan and elevation, respectively, of one of the individual hooper units;

FIGURE 8 is an elevational view of the insulative frame structure of the welding head;

FIGURE 9 is a view taken along the line 9—9 of FIGURE 8;

FIGURE 13 is a detail view of another of the contact strips;

FIGURE 14 is a detail view of another of the contact strip used;

FIGURE 15 is a partial view of a modified form of the invention;

FIGURE 16 is a partial view of a modified form of the invention;

FIGURE 17 is a partial view of another modified form of the invention; and

FIGURE 18 is a partial view of another modified form of the invention.

The machine includes a carriage assembly having a welding head which is supported over the stack of laminated sheets. The machine has means for translating the carriage to the right and left, looking at FIG. 1, over the stack of sheets. The machine also has means for translating or indexing the carriage in a direction at right angles to the aforesaid direction of welding travel so that the machine may be indexed to perform another group or plurality of welding operations. The machine also has means for lifting or raising the welding dollies at the time the carriage is indexed to set it up for another group of welding operations.

Figure 4:
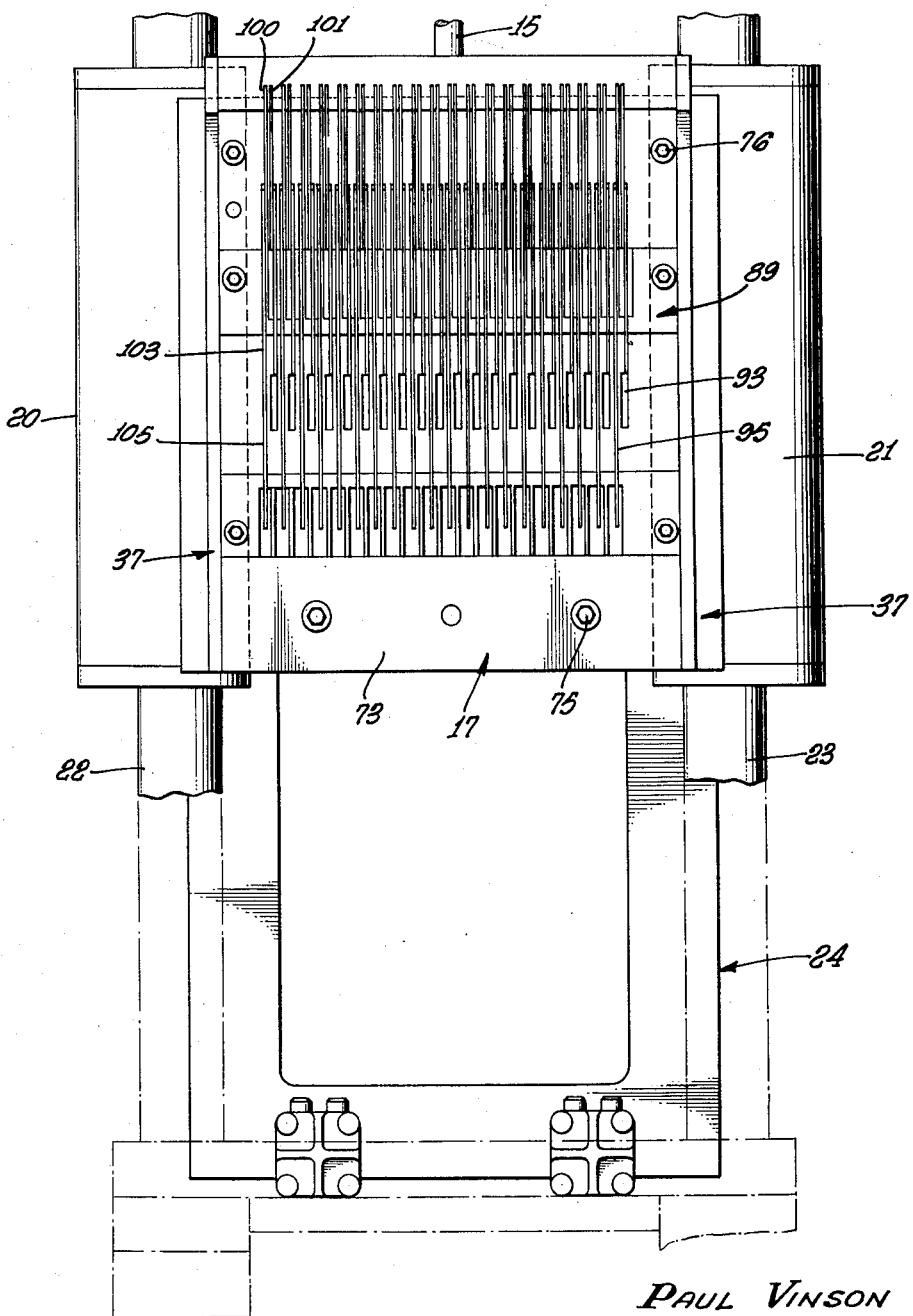
FIG. 4 is a plan view, partly broken away of the machine of FIG. 1.

The machine has upright frame or column members, as may be seen at 13 in FIG. 1, which support a piston assembly as shown at 14 in a horizontal position as may be seen in FIGS. 1 and 2. This piston assembly preferably comprises an air cylinder having a piston and stem 15 or rod operated thereby. The welding head assembly is designated generally by the numeral 17. On its opposite sides, it has a pair of cylindrical sleeves or bushings 20 and 21, as shown in FIGS. 2 and 4 and rods 22 and 23 extend through these bushings. The assembly 17 is able to translate horizontally on these rods, being driven by piston rod 15.

A similar structural mechanism is provided as part of the machine for indexing the carriage assembly 17 in a direction normal to the direction of travel while welding, this mechanism being the same as or similar to the one just described for translating the assembly as described in connection with FIG. 1.

Columns 13 are supported by pillow blocks shown diagrammatically at 9 which the indexing mechanism, not shown, operates to index the welding head as described.

As pointed out, after a welding operation, the assembly 17 is indexed laterally for another operation and in order to do this, the assembly of dollies, that is the welding rollers, are lifted from the surface of the honeycomb structure. The travelling dollies operate within a rectangular frame structure designated generally by the numeral 24 in FIGURES 1 and 4 which has straight side members as shown and which is made of a suitable material such as metal. Supported underneath this frame is a rectangular frame 25 or pressure pad, made of insulating material such as Micarta having end members, the inner sides of which are beveled as shown at 26 in FIGURE 1. The frame or pad 25 normally rests on the stack of sheets being welded. The structure comprising the frames 24 and 25 is supported on the piston rod stems 27 and 28 operated by air cylinders 31 and 32. The cylinders 31 and 32 are operated automatically at the termination of travel of the assembly 17 to lift the dolly assemblies or contacting rollers and to again lower them into welding position after the assembly 17 has been indexed laterally for another operation. The cylinders 31 and 32 are controlled by valves as shown at 33 and 34, automatically operated at the termination of carriage travel in either direction.

The frame or pad 25 is actually a grid of insulating material having spaced longitudinal slots through which the contactor rollers 40 to contact with the sheets being welded as may be seen in FIGURE 2. The lower sides of the members making up the frame 25 are corrugated so as to fit down onto the corrugated surface of the sheets or foils being welded as may be seen in FIGURE 2. The upper surfaces of the insulative, spaced members, or rack 11 are serrated or similarly corrugated to receive conductive backing bars 8 having the cross-sectional shape shown in FIGURE 2A. The bars are laid transversely between the members 11 in these grooves or serrations. A corrugated piece or strip to be welded is then placed over the backing bars, then an additional set of backing bars is placed in the valleys between nodes of that piece of material to be welded. Another strip or piece of material to be welded is then similarly laid over that set of backing bars as may be seen in FIG. 2. The welding rollers move longitudinally in the valleys between corrugations forming welds at the abutting nodes. The operation is series welding as distinguished from direct welding as will be explained more fully hereinafter.

The carriage assembly 17 comprises a rectangular frame as designated at 37 in FIGS. 1 and 4.

Numeral 39 in FIG. 1 designates one of the dolly assemblies which is shown more in detail in FIGS. 3 and 3A. There are twenty of the dollies or carriages, each provided with contactor rollers as designated at 40, made of copper or other conducting material, the rollers being adapted to travel in the groove between corrugations of a lamination of the honeycomb structure. Each dolly or carriage comprises an assembly as shown in FIGS. 3 and 3A comprising laminations of copper and Micarta as shown at 43, 44 and 45 in FIG. 3A. The copper laminations have extending electrical strips 47 and 48 so that the welding circuit is made through one of the copper laminations, one of the conducting rollers, through the sheets being welded, the other roller and the other copper lamination and conductor strip.

As may be seen in FIG. 1, electrical connections are made to the conductor strips 47 and 48 of the dolly by way of flexible, conductive strip leads or terminals having clips at their ends as shown at 51 and 52 in FIG. 1.

As will be described, separate electrical circuit connections are provided to each of the terminals of each of the individual dollies and each circuit is connected to its own individual transformer, not shown. The electrical leads are in the form of relatively thin strip connectors which are assembled in slots in a construction of insulating material carried by the assembly 17 and as will be described presently.

In the welding operation, arcing occurs at intervals between a roller 40 and the surface of the corrugated sheet, a spot weld occuring each time there is arcing. In order for proper and effective welding, each of the dollies and its contactor rollers must engage the surface with a desired predetermined pressure. In order to provide for the desired pressure, means are provided in the assembly to do so. Each of the dolly assemblies 39 is attached to a thin strip or column 55, the lower end of which has a recess as shown at 56 which engages a transverse pin 57 so that weight can be applied thereto and to the dolly assembly 39. Each of the stems or columns 55 extends upwardly through the assembly 17 and supports at its upper end a relatively thin rectangular tank or hopper as designated at 59 and as shown more in detail in FIG. 7. A web is provided between the column 55 and the bottom of the tank 59 at the sides as may be seen at 61. The hopper 59 is filled to a predetermined extent with masses, such as buckshot, which is variable in amounts so that the desired weight can be set and applied to the welding dolly.

The frame 37 of the assembly 17 has upstanding portions as shown at 63 and 64 in FIG. 1 and supported therewithin is an aluminum frame as designated at 68. Mounted on the frame 68 is an assembly fabricated of adhesive bonded insulative material which is preferably Micarta. This assembly is designated generally at 73 in FIG. 5. It has a horizontal front portion 74 which is bolted down as at 75 and 76 of FIG. 4. It has a back horizontal portion 78 slotted as may be seen at 79 in FIG. 9. It has an upstanding back portion 83 similarly slotted as may be seen at 84 in FIG. 8. At the sides or properly the ends of the assembly 73, it is enclosed by aluminum gussets having a slanted front surfaces as designated at 86 in FIG. 5.

Figure 10:
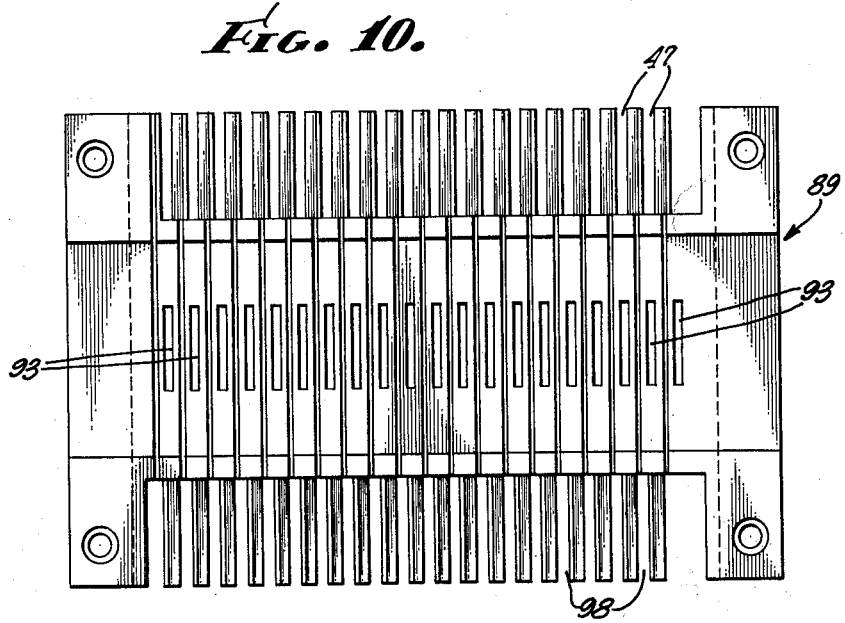
FIGURE 10 is a detail view of the insulative slotted block or insert in the welding head.
Figure 11:
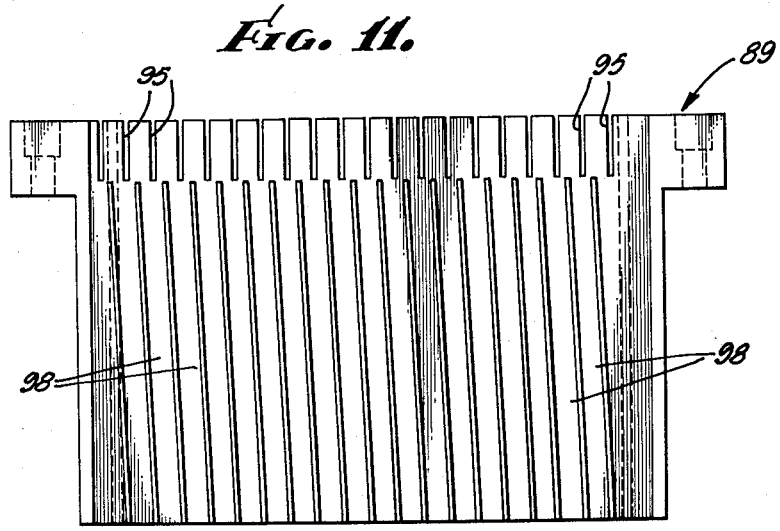
FIGURE 11 is an elevational view of the block of FIGURE 10.

The assembly 73 has a central opening as designated at 87 in FIG. 9 to receive an insulative insert member designated generally at 89 in FIG. 1. The insert member is shown more clearly in FIGS. 10 and 11. As may be seen, it fits into the opening 87 in the frame or unit 73 and is attached thereto by cap screws as may be seen at 90 and 91 in FIG. 2. As may be seen in FIG. 10, the insert 89 has parallel spaced slots or openings 93 to receive the upright standards or columns 55 which pass downwardly therethrough. The insert member 89 is slotted across its top as shown at 95 in FIG. 10 and its side portions are slotted as shown at 97 and 98 in FIGS. 10 and 11. As can be seen from the foregoing, the slots 84 and 79 match up with the slots 97 in the insert 89. As will be described, sets of contact strips are disposed in the slots 84 and 79 which connect to a set of strip contact members which fit in the slots and have portions shaped to fit into the slots 97 in insert 89. A second group of strip contactor members engages with these last mentioned contacts and extends through the slots 95 in the top of the unit 89, and these last contactors have portions which extend down into the slots 98 in the other side of the insert 89. The downwardly extending portions of the contactor members are connected to the flexible leads 51 and 52 which in turn connect respectively to the sets of contactor strips 47 and 48 on the welding dollies.

Figure 12:
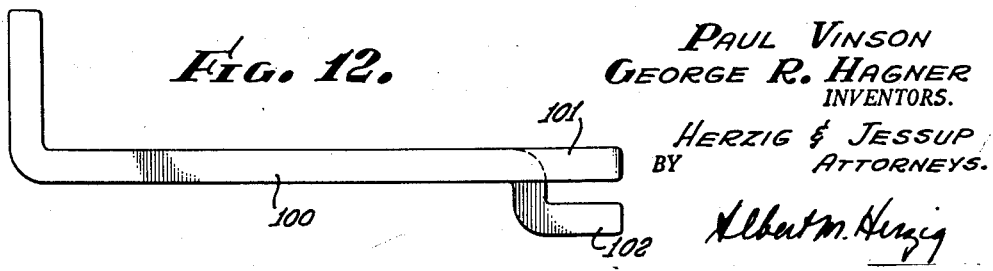
FIGURE 12 is a detail view of one of the contact or conductor strips used.

The contactor members referred to above will next be described. These contactor strips are shown in FIGS. 12, 13, and 14. The contactor strips having the shape shown in FIG. 12, as designated at 100 and 101, are provided in two sets of twenty each having the two shapes shown. These strips fit into the slots 84 in an upright position as shown in FIGS. 1 and 8, alternate strips having an offset portion as shown at 102 in FIG. 12. The horizontal L-shaped portions of these strips fit into the slots 79 as shown. The strip contactor members 103, as shown in FIG. 13, have portions fitting into the ends of slots 79 engaging strips 101 and portions extending downwardly in the slots 97 which portions are clipped to the clips on the ends of the flexible strip conductors 51 as may be seen in FIG. 1. The horizontally extending portions of the strips 103 fit into slots 95 in the top of the insert 89.

Contact strips 105 of FIG. 14 are disposed in the slot 95 and their downwardly extending portions extend through the slots 98 at which point they are connected to the clips at the ends of the flexible contact strip leads 52 which connect to the terminals 48 on the welding dollies. Contact strips 105 engage with strips 100. The assembly of the contact strips and the resulting circuitry may be observed in FIG. 4. As may be seen, each welding dolly has a separate circuit formed from the strip contactor elements which are held in the slots of the insulating material. Each circuit is therefore separate and insulated from every other circuit and furthermore, shielded therefrom. Both sides of twenty circuits extend up the upright 83. The nature of the assembly is such that it may be very conveniently and easily put together and disassembled. The design and arrangement of parts makes it extremely easy to remove and insert individual contactors in case of a fault in any individual strip contactor member.

Summarizing the operation of the device, the welding is accomplished by a circuit established between the welding rollers, spot welding occurring when there is arcing between a roller, and the surface of a lamination being welded.

The carriage or dolly translates or travels along the surface being welded and at the termination of its travel, the dolly is automatically lifted and indexed laterally or transversely in a position to make another group or plurality of welds. The dolly assembly then translates or moves in the opposite direction performing another welding operation, i.e., in other words, it welds while travelling in both directions. All operations may be automatic including the translation of the dolly assembly while welding, the lifting of the welding dolly and its indexing for another operation in the opposite direction.

The type of welding achieved by the machine is series welding as distinguished from direct welding. Preferably, alternating current power is used. The welding circuit is down through a contactor roller 40 into the assembly and up through the other contactor roller 40. A weld is achieved at both rollers when there is arcing between the roller and the surface being traversed. The arcing takes place at a predetermined point of the alternating current wave controlled from a control system providing for phase shift to any point of the sine wave.

In this assembly, the first contactor roller 40 acts as an electrode producing a weld as described; the circuit is then through the assembly of sheets to be welded and backing bars which themselves then constitute the welding electrode opposite the other roller 40. The distance between the rollers remains fixed so that the "throat" is held constant, the throat being that part of the welding circuit normally susceptible to variation in resistance during operation. As may be observed with known prior art types of welding machines, it is not possible to hold the throat constant during operations. Where circuit connections are made to the ends of the backing bars of the type shown in FIG. 2A, the throat diminishes as the welding dolly traverses and the welds become progressively weaker. If an attempt is made to compensate for this by using heavier currents, then the material being welded is burnt at positions where the throat is shorter.

The laminated sheets may be welded in stacks forming a honeycomb structure, and after each welding operation, another sheet or strip may be inserted manually or it may be inserted automatically by automatic machinery.

Particular novel features of the invention reside in the means shown for impressing a desired weight or force on each individual welding dolly unit. The weight may be adjusted as described by varying the amount of buckshot in the hopper supported by the dolly. Each dolly is relatively movable about the point of support of the hopper and, therefore, adjusts itself to the surface being traversed and each individual dolly is able to do so individually, irrespective of the others.

The assembly of the welding head is such as to be economical to fabricate, assemble and produce. As described, it provides for ease of assembly particularly as to the individual strip contactors used, which may be very conveniently and easily inserted and removed individually if desired.

FIGURE 15 is a partial view of a slightly modified form of the invention. In this form of the invention, the desired operating force or weight on the contactor rollers is not achieved by use of variable masses in the hoppers 59. Member 110 in this figure may be fixed or it may have a variable force or weight applied to it. Interposed between this member and the ends of the upright standards or columns extending upwardly from the dolly assemblies is a flexible, inflatable bladder 111 which engages with all of the uprights which are designated in this figure by the numeral 59. The pressure within the bladder 111 can be varied as desired and as may be observed, the force of each dolly assembly against the sheets being welded reacts against the bladder 111, so that a uniform, controlled force is applied to each one. Each one is nevertheless able to adjust itself relatively to the others in riding over the surface being welded so that despite any unevenness, the same contacting force is maintained.

FIGURE 16 shows a slightly modified form of the invention wherein a single contactor roller 40′ is utilized. The support or rack 11′ is made of insulated material such as Micarta as in the previous embodiment. In this form of the invention, the frame or pressure pad 25' carries contactor members at the ends aligned with the rollers 40' which engage the honeycomb over the ends of the backing bars 8' when the pressure pad is lowered. In other words, whenever a contactor roller 40' is lowered into contact for welding, the circuit is completed through the length of that particular back-up bar between the said contactors. If only one roller 40' were being used, only that one back-up bar would be energized and only through the length of it useful for welding.

FIGURE 16 shows the arrangement of the said contactor members at the ends of the pressure pad 25'. Preferably the contactor members have the shape shown at 115, having a pair of feet which ride in the corrugation over the backing bar 8'. The contactor member is pivoted on a pin 116 to a yoke 117. The yoke is on a stem 120. The stem is slidably mounted in a housing 121, carried by the frame 24' and is normally urged downwardly by a biasing spring 122. Numeral 123 designates the electrical connection to the contactor member. In operation when the frame 24' and pressure pad 25' are lowered, the contactor member 115 engages the honeycomb over back-up bar as described. The contactor is able to push upwardly so that the pressure pad 25' can seat with the roller 40' in contact as in the previous embodiment.

The welding circuit is through the contactor strip 41', the contactor member 115, the back-up bar 8' and roller 40'. This constitutes the welding circuit until the roller 40' reaches the mid position of the back-up bar 8', the circuit then shifts to the contactor member at the other end of the back-up bar and it is then through this end and through the back-up bar to the contactor roller 40', this now being the shorter circuit. When a plurality of single contactor rollers 40' are used, each back-up bar associated with a roller is energized in the manner described through its individual circuit. The bars are energized during welding only and, as may be seen, there are no permanent electrical connections to back-up bars either individually, or as an assembly. The support frame 11' or rack is itself made of insulating material as described, so of course there are no electrical connections to it.

FIGURE 17 of the drawings show another slightly modified form of the invention showing a different manner of applying the necessary pressure to the welding dollies. In this form of the invention, the rollers 40–b are on upright standards or stems 127 which extend upwardly through slots in the insulating insert 89–b and are linked at their upper ends to transverse links 128 which are slotted at their ends as shown, the slots engaging on pins 129 in the members 127. Above the links is a fluid pressure chamber 131, the lower side of which is closed by flexible diaphragm 132, which engages all of the links 128 as may be seen in the figure. The chamber 131 is supported in the welding head and as may be seen the diaphragm 132, exerts a downward pressure on all of the links 128, so that the same pressure is exerted on all of the individual dollies and each individual dolly is able to traverse the honeycomb core and adjust itself relative to the others with the same downward force being exerted on it.

FIGURE 18 shows another slightly modified form of the invention which is similar to that of the previous embodiment except that each of the uprights 127 carrying a contactor-roller is linked to a link 128–a which is pivoted to the insulative insert 89–c on a pivot 135. In other words, each of a pair of rollers 40–c through which a welding circuit is made, is connected to its own pivoted link 128–a. The inner ends of all of these links bear on a diaphragm 132–a closing one side of a fluid pressure chamber 131–a which is below the inner ends of the links. Accordingly the same pressure is exerted on the ends of all of the links so as to tilt the links to cause the rollers 40–c to exert the downward force on the honeycomb core.

As can be seen from the foregoing series welding is accomplished by the modified forms of the invention similarly to the welding as described in connection with the first embodiment. Electrical energization of backing bars is limited to a section of bar traversed by the contactor-roller for welding. The electrical circuitry is within the welding head. The rack on which the backing bars and sheets to be welded are stacked, is itself made of insulating material and is, of course, not any part of the electrical circuitry.

The foregoing disclosure is representative of preferred forms of the invention and is to be interpreted in an illustrative rather than a limiting sense, the invention to be accorded the full scope of the claims appended hereto.

What is claimed is:

1. In a welding machine adapted for welding together corrugated sandwiched layers to produce a honeycomb structure, a welding head carrying a plurality of sets of contactor rollers positioned in a manner for the welding head to traverse a corrugated sandwiched layer with the sets of rollers in contact with adjacent corrugations of layers for welding, an individual carriage for each set of rollers movable relative to the welding head, and mechanisms forming part of the welding head whereby a predetermined adjustable force is exerted by each set of rollers against the corrugated sheet being welded, said mechanism comprising means whereby each set of rollers is allowed to react independently against said force.

2. The machine of claim 1 wherein the last means comprises a container of shot supported by each carriage assembly, each of the carriage assemblies and its container being relatively movable and movable relative to the welding head itself.

3. In a welding machine adapted for welding together corrugated sandwiched layers to produce a honeycomb structure, a welding head carrying a plurality of contactor rollers positioned in a manner for the welding head to traverse a corrugated sandwiched layer with the rollers in contact with the layers for welding, an individual carriage for each contactor assembly movable relative to the welding head, mechanism forming part of the welding head whereby a predetermined adjustable force is exerted by each contactor assembly against the corrugated sheet being welded and the said welding head comprising a member formed of insulating material, said member having formed therein a plurality of parallel slots, said parallel slots having disposed therein electrical connector strips having flexible connections to the said carriage assemblies for forming individual welding circuits through the contactor rollers.

4. The structure of claim 3 wherein the insulating member has a vertical portion and a horizontal portion, each of said carriage assemblies having means extending upwardly through the horizontal portion providing for relative movement of each carriage assembly individually relative to the welding head, and means having a predetermined weight supported on each of the said upstanding means.

5. In a welding machine adapted for welding corrugated sandwiched sheets to produce a honeycomb structure comprising, in combination, a welding head carrying a plurality of individual carriage assemblies movable relative to the welding head, each assembly comprising a pair of spaced contactor rollers adapted to form a welding circuit through the spaced rollers and a section of sheet being welded spanned by the rollers, a plurality of means each supported by an individual carriage assembly comprising a container carrying a variable predetermined amount of removable weight to control the force exerted by the rollers of each carriage assembly against the sheet being welded, and means for causing the welding head to traverse the corrugated sandwiched sheets being welded.

6. In a welding machine adapted for welding corrugated sandwiched sheets to produce a honeycomb structure comprising, in combination, a welding head carrying a plurality of individual carriage assemblies movable relative to the welding head, each assembly comprising a pair of spaced contactor rollers adapted to form a welding circuit through the spaced rollers and a section of sheet being welded spanned by the rollers, a plurality of means each supported by an individual carriage adapted for carrying a variable predetermined amount of weight to control the force exerted by the rollers of each carriage assembly against the sheet being welded, means for causing the welding head to traverse the corrugated sandwiched sheets being welded and means for providing individual electrical circuit connections to each of the contactor rollers of each carriage assembly, said last means comprising insulating material forming a part of said welding head, said insulating material having a plurality of slots therein lying generally parallel to the contactor rollers, said slots having positioned in them electrical connector strips, the connections including flexible connections forming individual circuits connecting through the carriage assemblies to the contactor rollers.

7. The structure of claim 6 wherein the insulating material of the welding head includes a horizontal portion, the carriage assemblies having individual members extending upwardly through the horizontal portion for supporting the means adapted to contain variable weights.

8. In a welding machine for welding honeycomb cores in combination means comprising a welding head adapted to traverse the core and having a plurality of contactor-rollers adapted to weld along the core, said rollers being individually movable relative to the head and means for causing each roller to exert a controlled force against the core, said last means comprising link members connected to rollers and means comprising a fluid pressure chamber having an expansible diaphragm associated with said link members whereby the force exerted in said chamber is transmitted to all of said rollers individually.

9. The structure of claim 8 comprising a plurality of welding circuits, each including a pair of aligned rollers and an individual carriage for said pair of rollers and means whereby the force in said fluid chamber is transmitted to said individual carriages.

References Cited in the file of this patent

UNITED STATES PATENTS

| | | |
|---|---|---|
| 1,353,684 | Wagner et al. | Sept. 21, 1920 |
| 2,163,590 | Ganahal et al. | June 27, 1939 |
| 2,261,694 | Meenen | Nov. 4, 1941 |
| 2,780,716 | Wasilisin et al. | Feb. 5, 1957 |
| 2,892,922 | Hardesty | June 30, 1959 |

FOREIGN PATENTS

| | | |
|---|---|---|
| 437,403 | France | Feb. 16, 1912 |